United States Patent
Hagerman et al.

(10) Patent No.: US 8,099,354 B2
(45) Date of Patent: Jan. 17, 2012

(54) FINANCIAL MANAGEMENT SYSTEM AND RELATED METHODS

(75) Inventors: George William Hagerman, Denver, CO (US); Matthew Patrick Crooks, Littleton, CO (US); Lin Sun, Highlands Ranch, CO (US); Stephen Joseph Maegley, Broomfield, CO (US); Kevin Robert Ancell, Aurora, CO (US)

(73) Assignee: MBOX LLC, Denver, CO (US)

( * ) Notice: Subject to any disclaimer, the term of this patent is extended or adjusted under 35 U.S.C. 154(b) by 0 days.

(21) Appl. No.: 12/898,800

(22) Filed: Oct. 6, 2010

(65) Prior Publication Data

US 2011/0145127 A1 Jun. 16, 2011

Related U.S. Application Data

(63) Continuation of application No. 11/567,510, filed on Dec. 6, 2006, now Pat. No. 7,835,976, which is a continuation-in-part of application No. 11/071,064, filed on Mar. 3, 2005, now Pat. No. 7,983,969.

(51) Int. Cl.
*G06Q 40/00* (2006.01)
(52) U.S. Cl. ........................................ 705/37; 705/36 R
(58) Field of Classification Search ................ 705/36 R, 705/37
See application file for complete search history.

(56) References Cited

U.S. PATENT DOCUMENTS

| | | | | |
|---|---|---|---|---|
| 5,517,406 | A * | 5/1996 | Harris et al. | 705/30 |
| 5,893,079 | A | 4/1999 | Cwenar | 705/36 |
| 5,918,218 | A * | 6/1999 | Harris et al. | 705/37 |
| 6,233,566 | B1 | 5/2001 | Levine et al. | |
| 6,505,174 | B1 | 1/2003 | Keiser et al. | |
| 6,513,019 | B2 | 1/2003 | Lewis | |
| 6,556,976 | B1 | 4/2003 | Callen | |
| 7,013,291 | B1 * | 3/2006 | Green | 705/31 |
| 2001/0034678 | A1 * | 10/2001 | Lerner et al. | 705/35 |
| 2003/0144942 | A1 | 7/2003 | Sobek | 705/36 |
| 2003/0225662 | A1 * | 12/2003 | Horan et al. | 705/36 |
| 2003/0225663 | A1 * | 12/2003 | Horan et al. | 705/36 |
| 2004/0002913 | A1 * | 1/2004 | Breen et al. | 705/37 |
| 2005/0021443 | A1 | 1/2005 | Beard et al. | 705/37 |
| 2005/0154662 | A1 * | 7/2005 | Langenwalter | 705/35 |
| 2005/0240509 | A1 * | 10/2005 | Campbell | 705/37 |
| 2006/0015425 | A1 | 1/2006 | Brooks | 705/35 |
| 2006/0167786 | A1 | 7/2006 | Gambir et al. | 705/37 |

OTHER PUBLICATIONS

Sungard, STN Money Markets, Case Studies; SunGard 2002-2005; http://www.sungard.com/products_and_services/sfn/stn_money_markets/information/casestudies.htm (Dec. 7, 2004).
International Search Report and Written Opinion of the International Searching Authority, application No. PCT/US2007/083887, dated Mar. 28, 2008.

* cited by examiner

*Primary Examiner* — Jagdish Patel
*Assistant Examiner* — Sara Chandler
(74) *Attorney, Agent, or Firm* — Seyfarth Shaw LLP; Richard P. Gilly

(57) ABSTRACT

A financial management system includes a portal which makes transaction information available to a corresponding mutual fund in real time. In one implementation, information related to multiple portals can be presented to a mutual fund. Suitable programming may optionally identify, at least partially, the users associated with transactions associated with a given mutual fund.

10 Claims, 10 Drawing Sheets

| CACHEMATRIX | | | | | | | |
|---|---|---|---|---|---|---|---|
| Accounts Funds Trading | | | | | | | Welcome, Seth K |
| Today's Trades History Administration | | | | | | | |

.: ACCOUNTS                                                                                                        (A)   🖨 Printer Friendly Version Total Portfolio Balance: $795,585,116.61                           (B)   as of 05/03/2003   as of 10/01/2003

Account # 0201403022937 – CACHE MATRIX ACCOUNT 1                           Transaction History   Account Administration Account Established: 9/27/2003
Tax ID: XXXXX1111
No Current Funds                                                                                                               Trade 🔲
Total                                                                                                                                    $0.00

(C) Account # 0201403022937 – CACHE MATRIX TEST ACC # 2                   Transaction History   Account Administration Account Established: 9/19/2003
Tax ID: XXXXX5555

| Fund | 1-d Yield** | 7-d Yield** | Cutoff (Eastern) | Balance* | Accrued Interest MTD* | Transaction History | Trade |
|---|---|---|---|---|---|---|---|
| Janus T-E MMF/Service Shrs | 0.74 | 0.76 | 8:00 PM | $263,541.00 | $16.97 | View | 🔲 |
| Janus Money Market Fund/Svc Shrs | 0.80 | 0.79 | 8:00 PM | $3,256,464.00 | $253.66 | View | 🔲 |
| Janus Govt MMF/Instit Shrs | 1.02 | 1.01 | 8:00 PM | $0.00 | $0.00 | View | 🔲 |
| Janus T-E MMF/Instit Shrs | 0.99 | 1.01 | 8:00 PM | $246,543,246.00 | $20,858.05 | View | 🔲 |
| Total | | | | | | (D) $250,063,251.00 | |

Account # 0201403605211 – CACHE MATRIX TEST ACCOUNT # 3                   Transaction History   Account Administration Account Established: 9/22/2003
Tax ID: XXXXX5555

| Fund | 1-d Yield** | 7-d Yield** | Cutoff (Eastern) | Balance* | Accrued Interest MTD* | Transaction History | Trade |
|---|---|---|---|---|---|---|---|
| Janus Money Market Fund/Instit Shrs | 1.05 | 1.04 | 8:00 PM | $545,322,865.61 | $53,699.24 | View | 🔲 |
| Total | | | | | | $545,522,865.61 | |
| Total Portfolio Balance | | | | | | (E) $795,586,116.61 | |

* as of 06/03/2003   ** as of 10/01/2003

Call us at 1-800-CACHE-01      ©2003 CacheMatrix, All Rights Reserved. Member NASD      Terms of Use   Privacy Policy

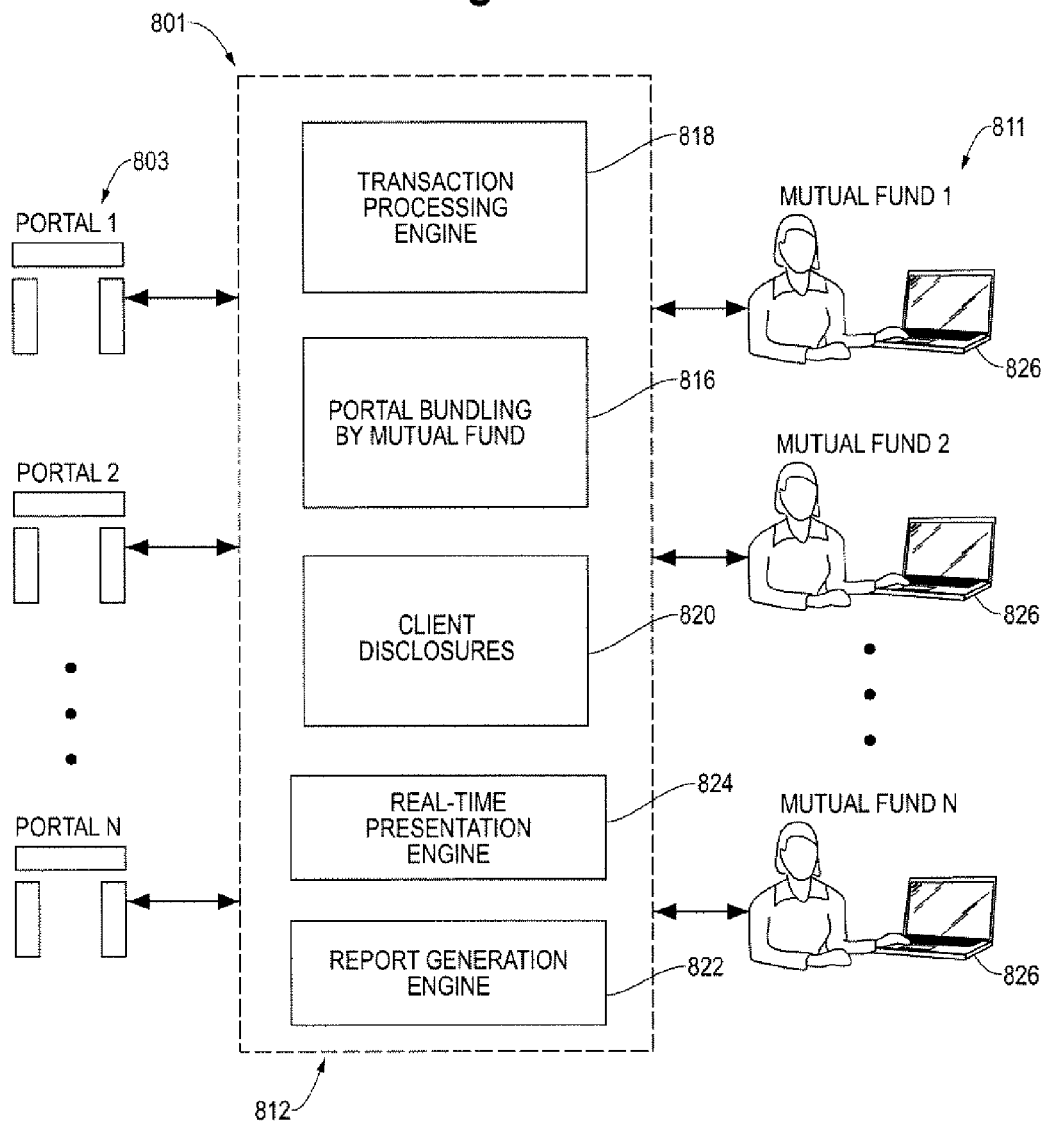

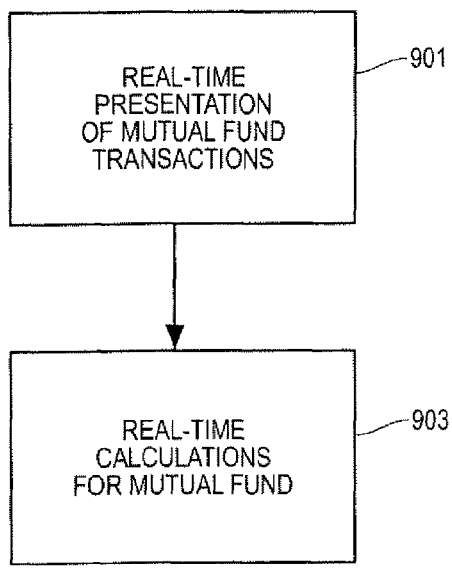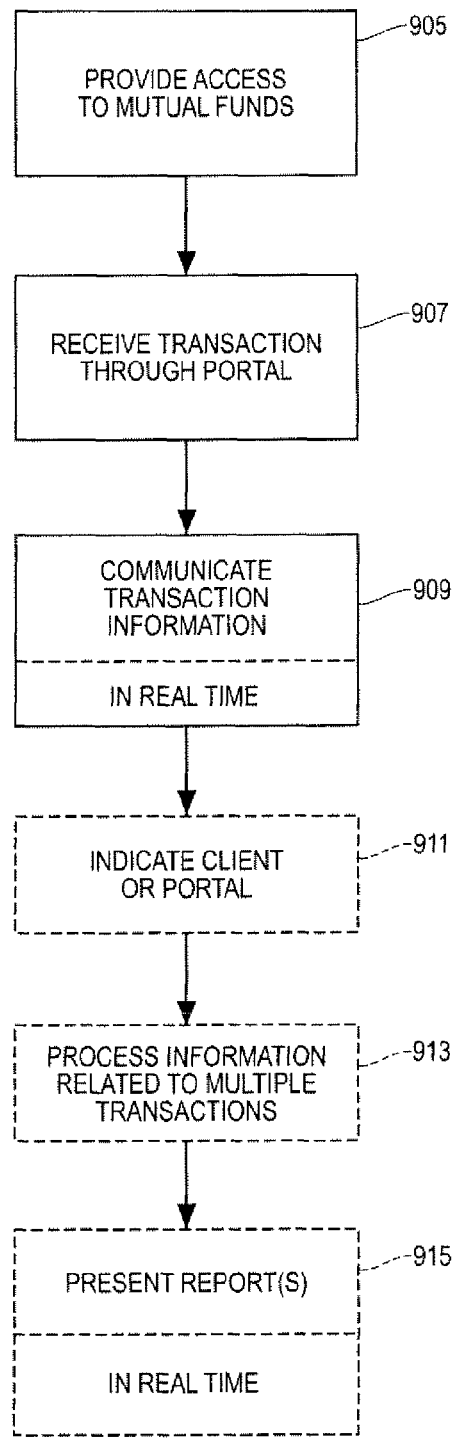

Fig. 11

FINANCIAL MANAGEMENT SYSTEM AND RELATED METHODS

CROSS REFERENCE TO RELATED APPLICATION

The present application is a continuation of U.S. patent application Ser. No. 11/567,510, filed Dec. 6, 2006 which is a continuation-in-part of U.S. patent application Ser. No. 11/071,064, filed Mar. 3, 2005, the disclosure of which is incorporated by reference.

TECHNICAL FIELD

This document relates to financial management systems, and more particularly to systems and related methods for managing mutual funds and transactions.

BACKGROUND

Institutional investors are investors that trade on behalf of institutional clients such as corporations, labor unions, retirement funds, and college savings or 529 plans. The trading habits and needs of institutional investors are quite different from the trading habits and needs of individual investors. For example, institutional investors generally manage large sums of money, often purchasing and redeeming tens of millions of dollars worth of mutual funds on a daily basis. Similarly, institutional investors are often active market participants, and possess expert knowledge about the markets in which they trade. They often use that knowledge to capitalize on breaking news that effects market valuations and performance. Given the size and volume of their daily trading activity, settling the accounts of institutional investors often requires regular transfers of large amounts of cash. This is usually done via an electronic or wire transfer, and separate wire transfers are generally required every time a mutual fund is purchased. Thus, when several mutual fund purchases are made throughout a trading day, several wire transfers are required to settle those purchase transactions. Institutional investors are also subject to self-regulatory restrictions not placed on ordinary investors, which put limits on how institutional investors can invest their mutual funds. As a result, they often need to know certain information that non-institutional investors do not need to know. For example, to ensure compliance with self-regulatory rules, institutional investors often need to know the relative size of the positions they take in given mutual funds. While securities trading systems are known in the art, none are generally designed to provide the types of information and functionality that are needed by institutional investors, and particularly by institutional investors who trade in mutual funds.

Mutual fund providers likewise need tools to effectively manage transactions associated with their mutual funds, especially when such transactions pass through mutual fund trading platforms (also known as "portals"). Managers of mutual funds often settle, trade, or otherwise perform transactions with multiple platforms or portals, and each such platform or portal generally has multiple clients associated therewith. It is therefore often desirable for managers of such mutual funds to have access to more information related to transactions coming through one or more portals and affecting their mutual funds under management.

Returning now to institutional investors and other clients of mutual fund trading portals, it is desirable for such clients to perform the same types of transactions through such portals as are available to such clients trading directly with the mutual funds themselves. It is therefore desirable for mutual fund portals to be substantially free of limitations or other constraints not generally found when trading directly with such mutual funds.

SUMMARY

A portal for mutual funds and associated methods for trading in mutual funds involve receiving a mutual fund transaction from a user and communicating, in real time, information related to the received transaction to a mutual fund associated with such transaction. A user may be any individual or entity associated with the mutual fund, the portal, or its transactions, such as a client of the fund or of a portal provider; an investor; an institutional investor; or agents, managers, brokers, employees or others associated with any of the foregoing. In this way, the mutual fund transaction is processed "straight-through", that is, without waiting for any end-of-day omnibus trade or settlement. In one variation, the user associated with the transaction may be identified, at least partially, to the mutual fund.

A graphical user interface may be associated with the portal and suitably programmed to receive input from a user associated with the mutual fund, such as a manager of the mutual fund. The user interface can be operated or programmed to present information to the mutual fund manager which such manager would find useful. For example, information presented to the mutual fund manager may involve automatically updating a data structure in real time to reflect transactions received. In another variation, the portal may be configured to allow trading by a user of the portal with a given mutual fund after the deadline normally associated with omnibus trades through such portal with the mutual fund.

In accordance with another aspect, a financial management system may be configured to present the transactions from at least two, different mutual fund portals in real time. Revenue streams from asset flows corresponding to each of the portals may be determined by such a system. Transactions received from multiple users may be communicated to corresponding mutual funds in real time. The users associated with such transactions may be identified, at least partially, to managers of the mutual funds with which such users are trading.

DESCRIPTION OF DRAWINGS

FIG. 4 is a screen shot showing an "Account" details section of one embodiment of the trading platform.

FIG. 5 is a screen shot showing a "Fund" comparison section of one embodiment of the trading platform.

FIG. 6 is a screen shot showing a "Trading" funds section of one embodiment of the trading platform.

FIG. 8 is a schematic showing further aspects of a financial management system, such as the one in FIG. 7;

FIGS. 9 and 10 are flow charts of some of the methods and operations associated with a financial management system hereunder;

FIG. 11 is a screen shot of one example of a graphical user interface associated with a financial management system hereunder.

Like reference symbols in the various drawings indicate like elements.

DETAILED DESCRIPTION

Figure 1:
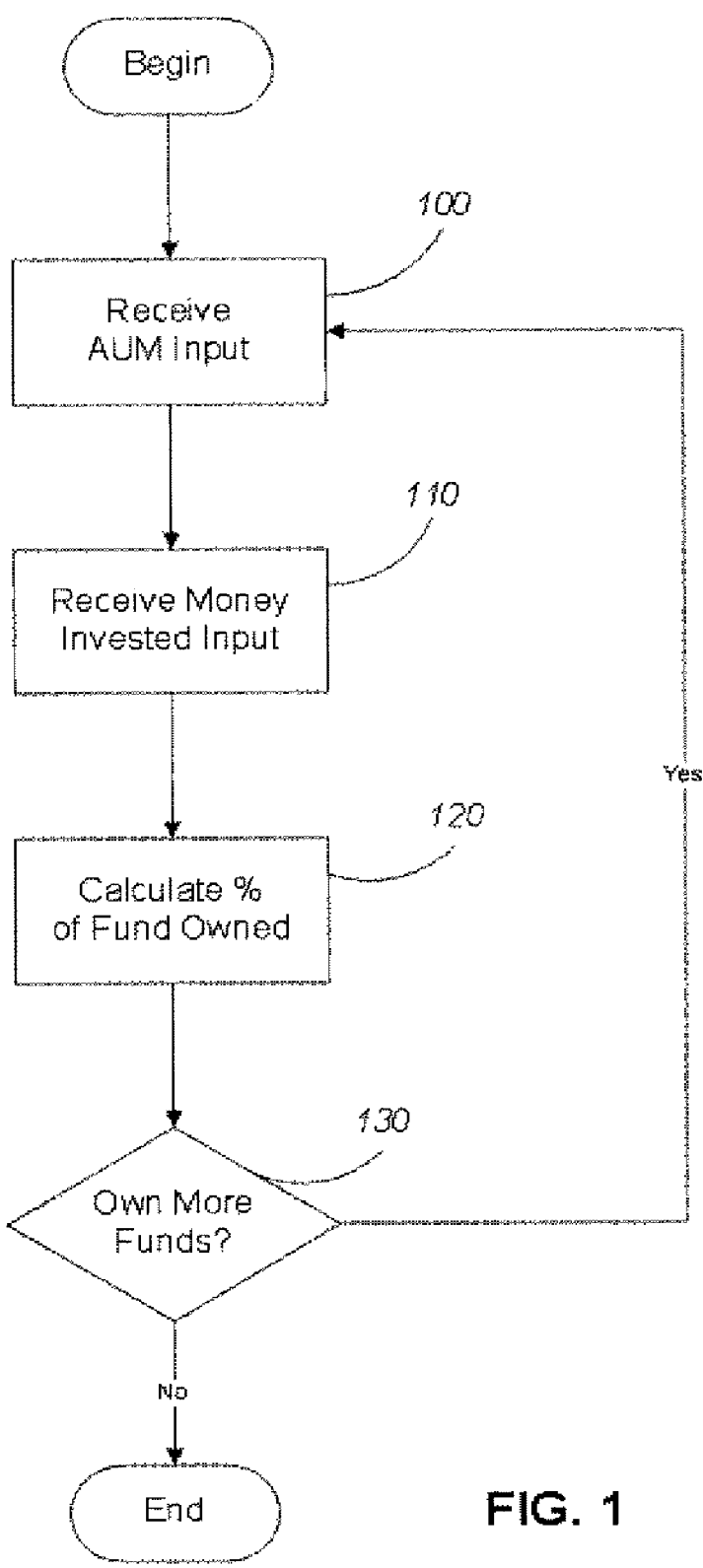
FIG. 1 is a flow chart depicting a method for determining the percentage of a mutual fund that is owned by a user.

The mutual fund trading platform of the present invention provides users with comprehensive on-line analysis, account management, and on-line mutual fund trading capabilities. It also allows users to exchange or transfer money from one mutual fund to another. Mutual funds may include or involve positions or assets in a variety of financial instruments. The money market mutual fund is one type of mutual fund suitable for the implementations discussed herein. Other types of mutual funds are also contemplated herein.

In one embodiment, a user's computer workstation is connected via the Internet or other communication network to a bank or broker's computer system. The bank or broker's computer system is in turn connected through the Internet or other communication network to one or more mutual funds (e.g., money market funds) or mutual fund trading systems. The bank or broker maintains an omnibus account for placing trades with the one or more mutual funds or mutual fund trading systems, and maintains information about each user, and information about each user's accounts on its computer or computer system.

In one aspect, the trading platform of the present invention allows a user to log onto the trading platform with a unique user identifier ("user ID") and password. Once logged on, the user can check account balances, transfer cash from outside accounts (e.g., via wire transfer), research potential mutual fund investments, and purchase, redeem and exchange shares of mutual funds. In one embodiment, the mutual fund activities, transactions, and other functionality available to the user are suitably displayed or made accessible via a graphical user interface. The interface allows the user to view interrelationships between financial information and financial operations, and thereby facilitates analysis and financial transactions that are based, at least in part, on viewing the financial information and operational interrelationships.

Once logged-on, the trading platform provides useful account information to users. The account information includes the names and numbers of all of the accounts that are owned by the user, and the balance of the portfolio managed by the user (i.e., the sum of all of the money that is held in all of the user's accounts). For example, the trading platform can provide information indicating that a user has two accounts worth a total of approximately $795 million dollars—a pension fund account worth approximately $545 million dollars and a self-insurance account worth approximately $250 million dollars. For each of the user's accounts, the trading platform displays the date the account was opened, a portion of the unique customer identification number associated with the account, the names of all of the mutual funds in which assets are held, the amount of money held in each mutual fund, and the total amount of money held in the account.

The trading platform allows users to research and purchase mutual funds. Mutual funds can be researched by displaying all of the mutual funds available for purchase through the bank or broker, or by displaying only those mutual funds that satisfy certain filter criteria. Displayed mutual funds are generally displayed together with the criteria that are used to filter the mutual funds. These criteria can include the names of the mutual funds, their ticker symbols, their Committee on Uniform Securities Identification Procedures ("CUSIP") identifiers, the total assets under management ("AUM") for the mutual fund, the current amount of the mutual fund that is owned by the user (e.g., in both absolute terms and as a percentage of AUM), the 1-day, 7-day, and 30-day mutual fund yields, various mutual fund ratings (e.g., Moody's, S&P, Fitch & NAIC), the type of mutual fund (e.g., prime, municipal or treasury), the mutual fund's date of inception, expense ratio, and more. Displayed mutual funds can generally be sorted by the filter criteria. For example, the mutual funds can be sorted in ascending or descending order to show which mutual funds have the highest or lowest 7-day effective yield.

Among the information the trading platform can display to a user is the percentage of each mutual fund that is owned by that user. The trading platform determines this percentage as shown in FIG. 1. On a periodic basis, which is typically daily, the trading platform receives input from each mutual fund that can be traded, indicating the total assets that mutual fund currently has under management. This information can be stored in a database that is associated with the trading platform, or it can be retrieved whenever a user requests a display of the percentage of mutual funds owned. The trading platform determines the percentage of each mutual fund owned by receiving input for each mutual fund indicating that mutual fund's current assets under management (step 100) and the amount of money the user currently has invested in the mutual fund (step 110). After determining the current assets under management and the amount the user has invested in a mutual fund, the platform determines the percentage of the mutual fund owned by dividing the amount invested by the assets under management (step 120). The trading platform calculates and displays this percentage for each mutual fund that is owned by the user (step 130). When the user maintains multiple accounts, the trading platform determines the percentage of mutual fund owned for each of the user's accounts. By determining and displaying the percentage of mutual funds owned, the trading platform provides users with the needed means to monitor and ensure compliance with applicable regulatory rules, such as self-regulatory rules.

The trading platform also allows users to trade shares in one or more of the available mutual funds by placing orders to purchase, redeem, or exchange shares. The orders can be placed, for example, by selecting an item in a drop down transaction menu that appears next to each mutual fund's name. When the user elects to redeem mutual fund shares, the trading platform provides a text box, drop down menu, or other similar means for the user to indicate the dollar amount that the user wishes to redeem. The trading platform also provides a text box, drop down menu or other suitable means to allow the user to identify the bank account to which the user wishes the redemption proceeds to be deposited.

Figure 2:
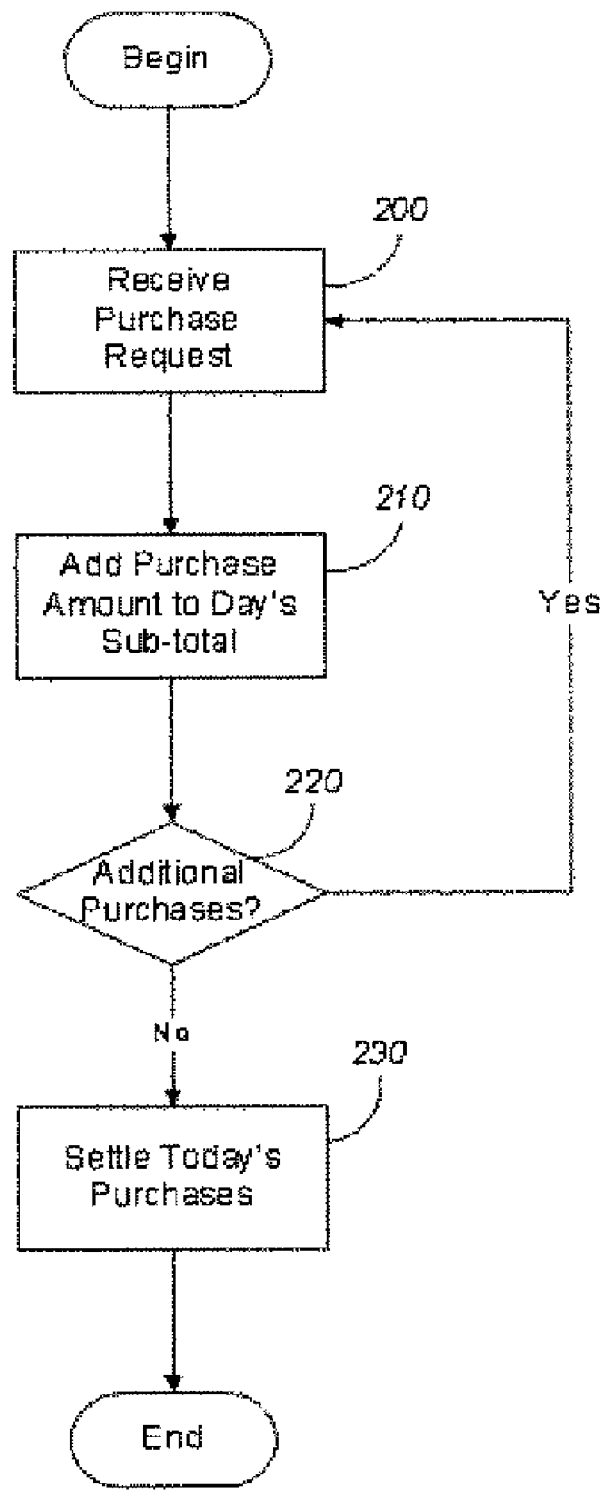
FIG. 2 is a flow chart depicting a method for aggregating the mutual fund purchases of a user, thereby allowing the investor to settle his or her account a single time for the aggregate purchase amount.

When the user elects to purchase shares, the trading platform provides a text box, drop down menu or other means for the user to indicate the dollar amount of the mutual fund that the user wishes to purchase. The trading platform allows a user to make multiple mutual fund purchases over the course of a trading day, and to aggregate those purchases so that the user can settle his or her account a single time at the end of the trading day via a single wire transfer. In one embodiment, as shown in FIG. 2, when the trading platform receives a purchase request (step 200), it adds the current purchase amount to a daily purchase sub-total (step 210). If additional purchases are made throughout the day (step 220), the trading platform receives those additional purchase requests (step 200), and adds the additional purchase amounts to the daily purchase subtotal (step 210). As a result, at the end of the trading day, the trading platform can determine the amount needed to settle the user's account (step 230). This allows a user to settle his or her account in a single transaction, by ordering a single wire transfer in the amount of the final daily purchase sub-total, while making one or more purchases from one or more mutual funds throughout the trading day.

Figure 3:
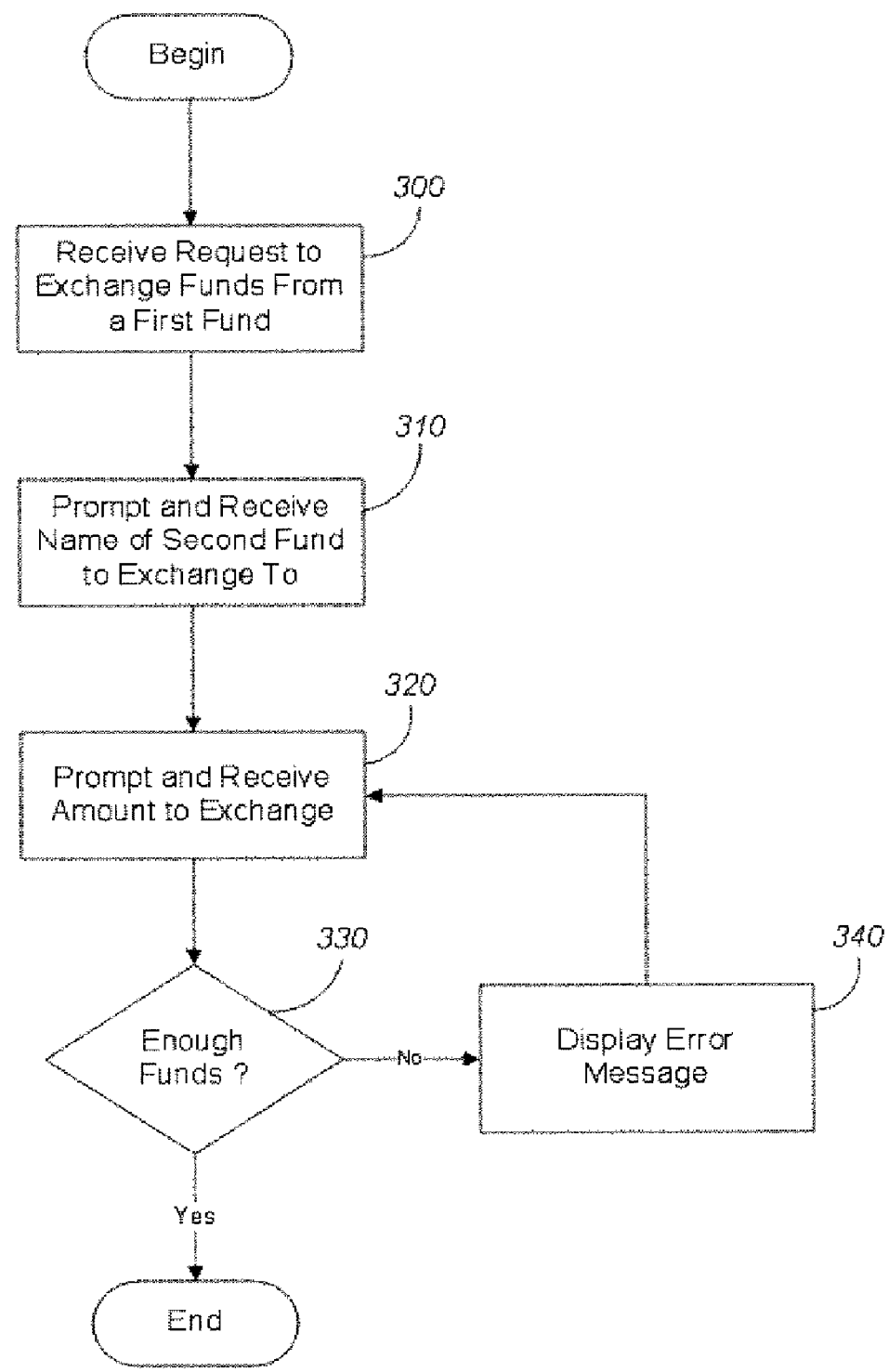
FIG. 3 is a flow chart depicting a method for allowing a user to exchange mutual funds.

The trading platform also allows a user to exchange mutual funds from one mutual fund to another mutual fund without depositing additional cash into his or her account. For example, as shown in an embodiment depicted in FIG. 3, the trading platform is configured to receive a user request to exchange funds from a first mutual fund (step 300). Upon receiving the request, the trading platform provides the user with a text box, drop down menu or other means to indicate the name of a second mutual fund in which the user wishes to acquire shares by exchanging shares from the first mutual fund (step 310). The trading platform then provides the user with a text box, drop down menu or other means to indicate the dollar amount of shares that the user wishes to exchange from the first mutual fund to the second mutual fund (step 320). Next, the trading platform verifies that the user has a large enough position in the first mutual fund to allow the desired exchange from the first mutual fund to the second mutual fund (step 330). If the user does not own sufficient shares of the first mutual fund, an error message is displayed (step 340), and the user is again prompted to enter a new dollar amount (step 320). When the user enters a dollar amount that can be covered by the user's assets in the first mutual fund, the trading platform completes the exchange of funds from the first mutual fund to the second mutual fund, without requiring a deposit of additional cash into the user's account.

Each of the features of the mutual fund trading platform described herein are accessible through interrelated areas that are displayed together or in a logical fashion as a web of linked documents. In one embodiment, each feature is available in a document that can be displayed to a user via a web browser or other suitable graphical user interface. For example, as shown in FIG. 4, the trading platform can display user account information such as the number and type of accounts, the holdings and total value of each account, and the total holdings in all accounts to a user that successfully logs-on to the trading platform. From the user account page, the user can administer his or her account through the "Administration" tab, review that days transactions through the "Today's Trades" tab, review even more transaction history through the "History" tab, search mutual funds through the "Funds" tab, or trade funds through the "Trading" tab.

Figure 5:
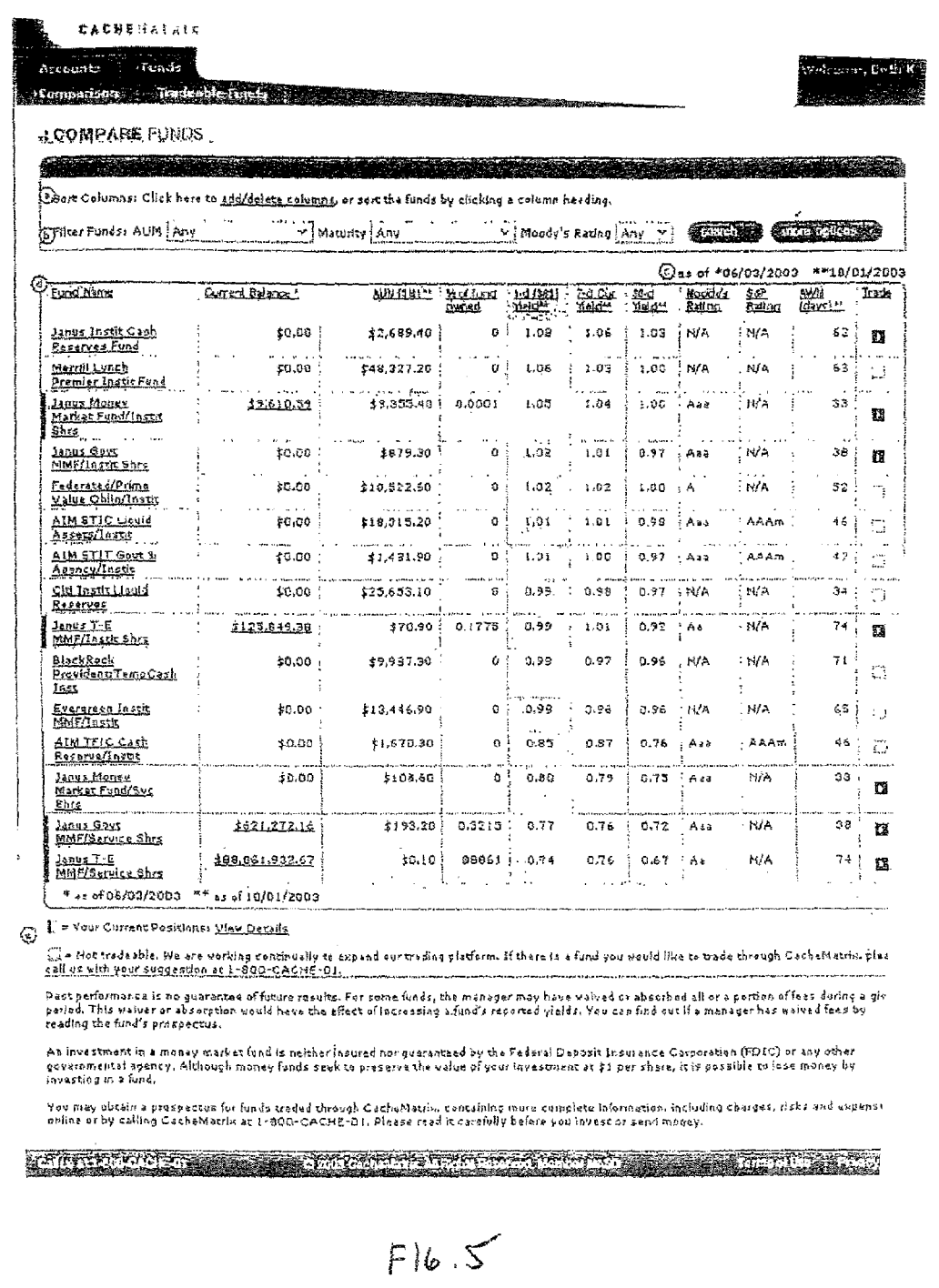

As shown in FIG. 5, the trading platform allows a user to research all of the mutual funds that are available for trading by selecting the "Funds" tab. When the "Funds" tab is selected, various information such as the mutual fund name, current assets under management, and 1-day and 7-day yields are displayed. The user can customize the type of information that is displayed by adding or deleting columns of information. The user can also use the information that is displayed to filter, find, and display only those mutual funds that are of interest to him or her. For example, the user can filter, find and display only those funds that are rated "AAA" by Moody's and that have more than $5 billion dollars in assets under management. From the "Funds" tab, the user can return to the "Accounts" tab to display all account information, or can select the "Trading" tab to purchase, redeem, or exchange mutual funds.

Figure 6:
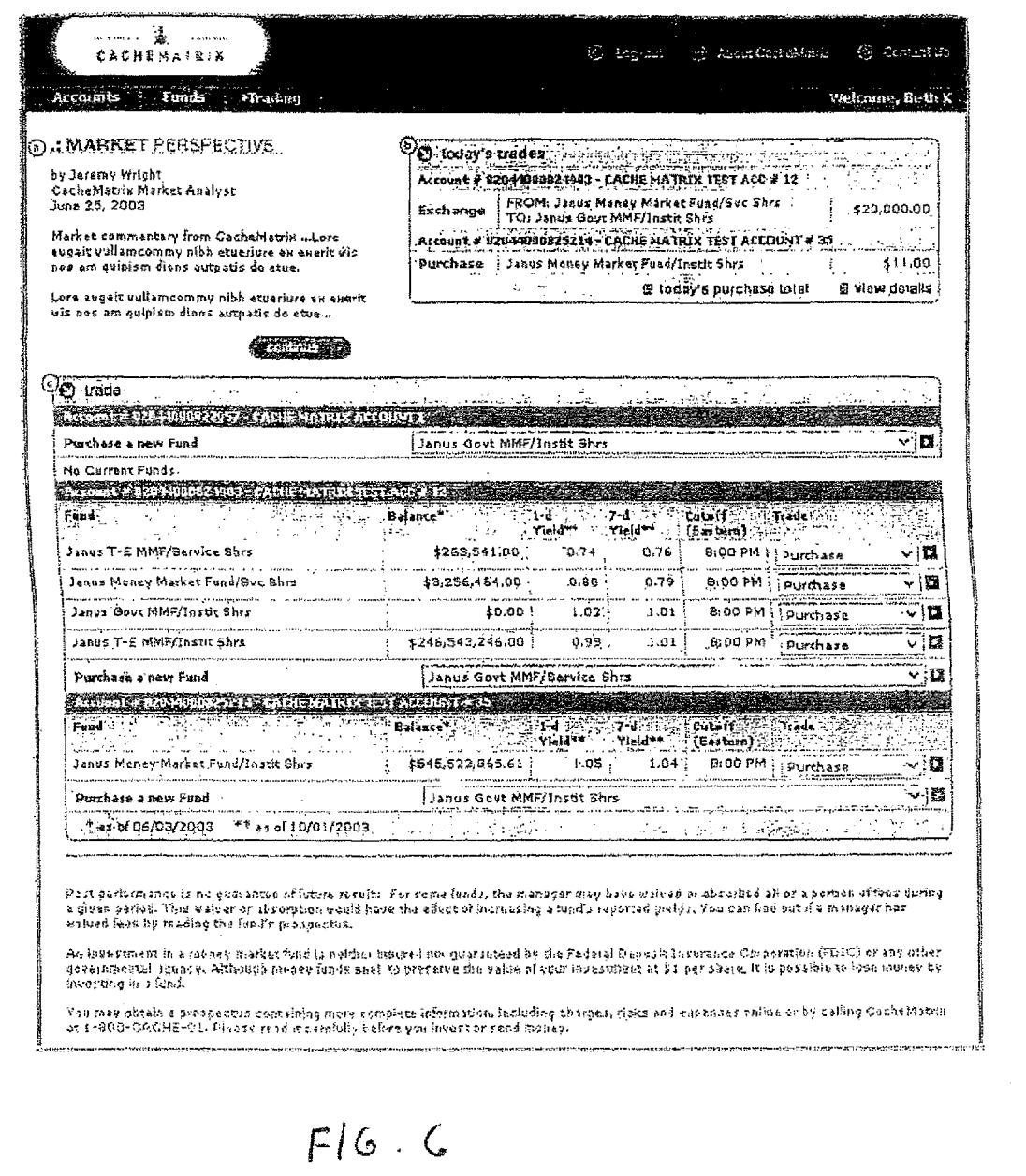

As shown in FIG. 6, upon selecting the "Trading" tab, the user is presented with a summary of the day's trading activity, a drop down menu that allows the user to purchase a mutual fund from a list of mutual funds, and a list of the user's account holdings. The list of the user's account holdings includes a drop down menu that allows the user to alter his or her current account holdings by purchasing, redeeming or exchanging those mutual funds in which the user currently holds shares. For example, the user can add to his or her holdings by purchasing additional mutual funds, or the user can liquidate a fund position by redeeming all of the shares held in that mutual fund. Upon purchasing additional mutual fund shares, the trading platform displays a pop-up menu that shows the current daily purchase sub-total. By running and displaying a daily purchase subtotal, the trading platform allows the user to settle the day's current trading activity by making a single wire transfer payment in the amount of the daily purchase sub-total as explained above with respect to FIG. 2.

The trading platform of the present invention is implemented on a bank or broker's computer or computer system. The bank or broker will generally maintain an omnibus account with one or more mutual funds or mutual fund trading systems to give users access to the mutual funds that are offered through the trading portal. When a user purchases or redeems shares of a mutual fund through the trading portal, the bank or broker purchases or redeems shares of that mutual fund on behalf of the user by placing appropriate orders through the bank's or broker's omnibus account. Because all mutual fund purchases, redemptions and exchanges entered by users through the trading portal are ultimately placed through the bank's or broker's omnibus account, the bank or broker can aggregate all of the orders placed by users to each mutual fund that is available for trading, and make a single or net trade with each fund to balance the bank's or broker's omnibus account. In this way, the content of the bank's or broker's omnibus account will reflect the net holdings of the user accounts that have access to and trade mutual funds through the trading portal.

The trading platform can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The trading platform can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language, if desired; and in any case, the language can be a compiled or interpreted language. Suitable processors include, by way of example, both general and special purpose microprocessors. Generally, a processor will receive instructions and data from a read-only memory and/or a random access memory.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks.

Any of the foregoing can be supplemented by, or incorporated in, ASICs (application-specific integrated circuits).

To provide for interaction with a user, the trading platform can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications can be made without departing from the spirit and scope of the invention. For example, the steps of the invention can be performed in a different order and still achieve desirable results. While the trading platform was described in terms of a series of linked documents, the available features can be presented in a single viewable area such as in a single viewable document or a single window with multiple window panes. While the trading platform was described as being viewable through a custom graphical user interface, the platform can also be viewable through a convention web browser such as the Internet Explorer, Netscape Navigator web or similar such browsers. Accordingly, these and other embodiments are within the scope of the following claims.

Figure 7:
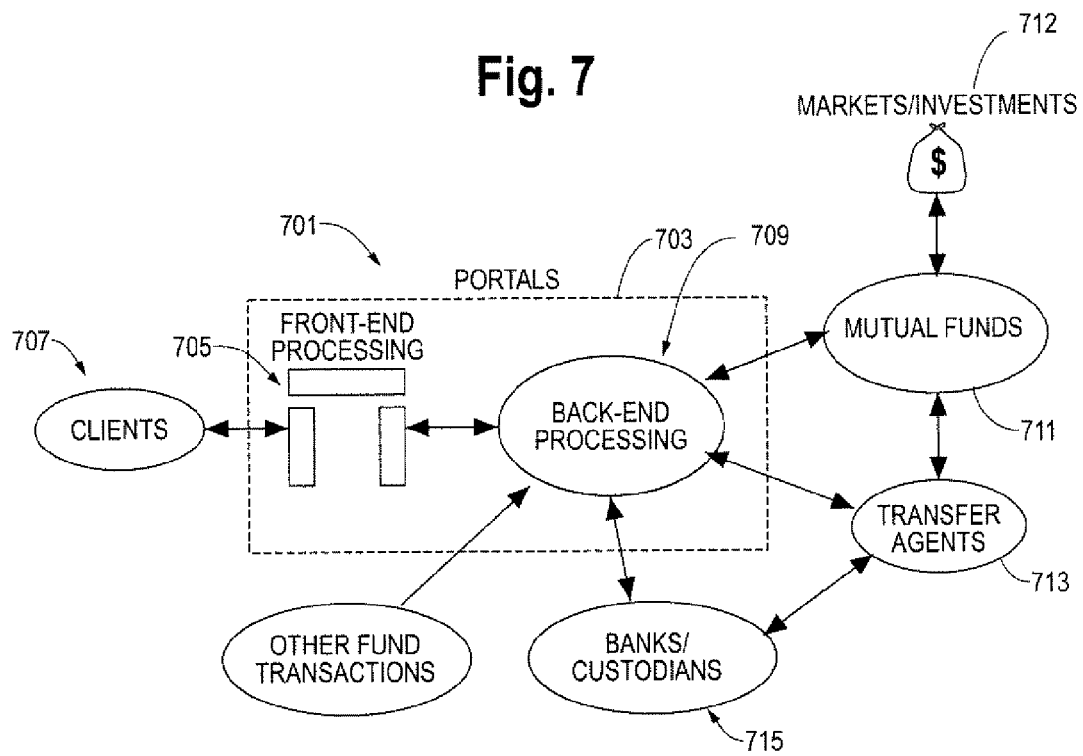
FIG. 7 is a schematic of one implementation of a financial management system.

Another possible implementation contemplated hereunder involves a financial management system for mutual funds and transactions associated with such funds. FIG. 7 is a schematic of one implementation of such a system, including financial management system 701.

Financial management system 701 includes one or more platforms or portals 703 (the terms are interchangeable herein) for trading, tracking, reporting, or performing any number of other operations and functions associated with mutual funds. Portals include a variety of features and functions related to mutual fund trading, tracking, and reporting, generally implemented through software, hardware, or a combination of the two. As such, the terms "trading," "performing transactions," and other descriptions of the functions of system 701 should be understood in their broadest sense to encompass the many and varied activities involved in the mutual fund world and the many users of systems associated with such world. Portals 703 include suitable programming, generally referred to as front-end processing 705, for receiving and processing one or more mutual fund transaction from one or more users 707. Certain processing, such as aggregating transaction information, can take place more independently of users 707, such processing referred to as back-end processing 709. The distinctions between front- and back-end processing can vary and be somewhat artificial, but can be considered to divide roughly along whether the processing relates more to the user input (front-end) or more to the mutual fund (back-end). User 707 can interact with portal 703 to transmit transactions and request information, reports, and perform any of the other operations and functions discussed previously with reference to FIGS. 1-6. Depending on the nature of the interaction with the portal, front-end processing 703 or back-end processing 709 can be involved.

In this implementation, portal 703 is suitably programmed to communicate, in real time, information corresponding to a received transaction to a mutual fund 711 associated with the transaction. It is understood that mutual fund 711 can include any number of personnel, such as fund managers, as well as computers and other automated systems. As such, information about mutual fund transactions received through portal 703 can be made available in real time to such fund managers.

It should be understood that communicating information through the portal to the mutual funds has its broadest meaning and would include data transmission, per se, as well as storage of information at a location accessible to mutual funds or otherwise. Information made available in real time to a mutual fund can be further processed either directly or indirectly.

Communication of information in "real time" encompasses immediate and relatively immediate communication, as there is generally a lag time associated with data transmission, computer processing, updating, refreshing, and other latencies of financial management system 701. Even beyond such lag times or latencies, real time availability or communication also encompasses periodic updates throughout a relevant trading period, such as a trading day, and thus real time communication can include multiple trades or aggregations of trades communicated periodically in batch form to mutual funds. As such, the term "real time," when used in connection with the implementations of this application, should be given a broad meaning and is meant merely to exclude or distinguish communication or availability of information from omnibus trades or settlements occurring at the end of the relevant trading period, typically toward the end of the trading day. By communicating transactions through portal 703 in real time, whether relatively continuously or periodically throughout the day, system 701 provides an alternative to the omnibus trade or settlement toward the end of a relevant trading period (e.g., a trading day).

By employing real-time availability, system 701 accords mutual fund companies and their managers greater flexibility in handling their assets under management ("AUM") during trading hours. Such flexibility, as opposed to a larger, omnibus trade later in the trading day, permits fund managers to maximize the fund's yield by adjusting the timing of investments or divestments, depending on fluctuations in the market or other factors. As such, mutual funds 711 (including their fund managers) have more information or opportunities to perform transactions, including electronic transactions, with suitable markets/investments 712 during a trading day. Mutual funds 711 can also communicate with mutual fund transfer agents or agencies 713 in relation to various mutual fund transactions. Transfer agents 713, in turn, communicate, as appropriate, with the custodians of the mutual funds associated with the transactions of transfer agents 713, such custodians 715 often being banks.

FIG. 8 is another schematic of an implementation of a financial management system 801. System 801 interacts with multiple users, including managers of corporate investments, funds, CFOs, and other managers of mutual fund investments. Such users may be affiliated with one or more portals 803, each of which has certain mutual funds 811 associated therewith, and such portals include the various features, operations, and transaction processing capabilities discussed previously with reference to FIGS. 1-7. The various features and functions of management system 801, including portals 803, can be made available across multiple portals 803 and to multiple fund managers 811, and are therefore shown broken out separately by reference number 812 in FIG. 8. It will be appreciated that the exact location of the software and hardware for performing functions 812 of financial management system 801 can be varied to suit any number of applications or needs. Thus, each of the portals 803 can include some or all of the functions 812, and those functions can be available via a network, locally, remotely, through the world-wide web, through web-server applications, and the like.

Each of the funds 811 can similarly be available through multiple portals 803. Thus, for example, a given portal provider may have agreements or other arrangements with multiple mutual funds so as to offer a menu or range of mutual funds to the portal provider's users. Other portal providers may have similar arrangements with some or all of the same mutual funds and make such funds available through their respective portals.

To accommodate such a situation, system 801 can be suitably programmed to bundle some or all of the portals with which a given one of the mutual funds 811 is associated. In other words, a given mutual fund can keep track of activities related to its fund even when such activities are occurring across multiple portals, by virtue of suitable programming, related hardware, or a combination (reference number 816).

While the other functions and features of system 801 can be grouped in any number of ways, in the implementation illustrated in FIG. 8, they have been defined as a series of modules or engines including, for example, a transaction processing engine 818. Engine 818 can be involved in: receiving mutual fund transactions through one or more of the portals 803; determining revenue streams from asset flows corresponding to each of the portals; or accomplishing purchases, redemptions, and any of the other associated operations or processes associated with trading and management of mutual funds by portals 803.

Functions 812 of system 801 can also include suitable programming for identifying, at least partially, the user associated with a given mutual fund transaction (block 820). The amount of information transmitted through portals 803 to mutual funds 811 about users can be varied to suit the particular application, privacy or regulatory concerns, or any number of other preferences. Thus, for example, the identity of a particular user can be coded or otherwise associated with indicia to enable managers of the funds 811 to gather useful information about such user without necessarily disclosing all details of such user. Thus, the code could be associated with a given geographic region, a given demographic, industry sector, or users of a given size or investment strategy. It may be desirable for there to be full disclosure of a user performing transactions associated with a mutual fund through a portal. In such case, full disclosure would identify the user with greater specificity, such as by identifying the actual name, account number, CUSIP and the like. Still other variations and degrees of identification are possible.

As discussed with reference to the implementations of FIGS. 1-7, financial management system 801 includes suitable programming to generate statistics, reports, and other useful information, whether aggregated or not, useful to any users involved with mutual funds and associated trading. Thus, report generation engine 822 can be automatically or selectively accessed to compile statistics in any number of ways, including: determining revenue streams from asset flows corresponding to each of the portals; tracking recent transactions by fund, by user, by portal, and the like; aggregating transactions over periods of time; and sorting or otherwise compiling such transactions to provide useful insights to users of system 801. Report generation engine 822 can be tied to any number of other functions, including transaction processing engine 811, portal bundling routines 816, user disclosure routines 820, and real-time presentation engine 824 (discussed subsequently). By interacting with each other, the various modules of system 801 can be automatically or selectively operated to aggregate transactions, track real-time cash flow, generate alerts, and track real-time trading activity, and suitable presentation of this data in any number of formats can be accomplished.

Any and all of the functions described above with reference to financial system 801 can be performed in real time, as that term was discussed and described previously. So, in one aspect, a real-time presentation engine 824 makes available real-time trading activity, at any suitable level of detail and at any suitable frequency, during the course of a trading day, to one or more of the mutual funds 811. Information presented can be aggregated and presented in any number of ways useful to managers of funds 811. In one implementation, mutual funds 811 can access transaction information in real-time through a suitable graphical user interface, such as the display screen of a networked computer 826. Information can be presented as a graphical representation of processed information or other indicia corresponding to the information communicated to the mutual fund by the portal. Thus, for example, real-time presentation engine 824 can be suitably programmed to enable presentation of recent transactions individually, and such presentation can be done in a list form. The list can be updated as additional transactions are received, either automatically or when refreshed by the user of the graphical user interface of network computer 826. As a further example, transactions can be aggregated for each of a plurality of portals as of a certain time during a trading day and suitably presented in any number of graphical forms. Still other real-time presentation scenarios are possible.

It will be appreciated from the foregoing description that any number of methods can be practiced in view of the functions and operations available under financial management systems 701, 801, and the portals 703 and 803 associated with such systems. Thus, for example, the systems enable presentation to a given mutual fund of mutual fund transactions from at least one portal in real-time (block 901). Information related to the transaction is available to a user associated with the mutual fund at a point in time during the trading day, which may be before the deadline typically associated with omnibus trades. As such, the transparency of the mutual fund transaction being processed through the portal can enable a corresponding real-time calculation based on such transaction for the given mutual fund (block 903), and the ability to make such real-time calculation may have benefits to the mutual fund associated with such transaction.

Referring now to FIG. 10, users, such as institutional investors, are provided access to mutual funds (block 905). A transaction associated with the user is received. Such transaction can correspond to a redemption or a purchase associated with a given one of the mutual funds available to the user (block 907). As a result of receiving the transaction, at some point subsequent to receipt, information corresponding to the transaction is made available to the mutual fund associated with the transaction (block 909). The information can be made available (e.g., communicated) in real-time.

An indication of the user or the portal associated with the transaction can be provided. Such indication can be partial or general, as discussed previously with respect to a code, or the indication can be sufficient to constitute a full disclosure of the identity of the user associated with the given transaction (block 911). It will be appreciated that the transaction can also be processed and handled without identifying the user to the mutual fund, and the provision of identifying information to the mutual fund is thus optional.

Multiple transactions associated with a given mutual fund can be received, optionally, and information related to such multiple transactions can be suitably processed for any of a variety of purposes (block 913). Again, optionally, the processing of information related to multiple transactions accomplished in block 913 above can furnish the basis for presenting one or more reports (block 915), and such reports can be presented in real-time.

One or more of the processes outlined in FIG. 10 can be performed or accomplished after a predetermined deadline normally associated with omnibus trades. Thus, for example, a mutual fund transaction received through the portal in block 905 can be received after the predetermined deadline, and the corresponding information about the transaction can be communicated to the mutual fund (block 909) after the predetermined deadline, as well.

The financial management systems 701, 801 are suitable examples of systems capable of performing the methods described above. Other systems are likewise suitable, and the features and functions discussed herein can be combined with other processing, reporting, or other features and functions related to money and asset management, including larger banking and financial systems associated with other aspects of markets, investments, and the economy. While the currency associated with systems 701, 801 has been described as mutual funds, it will likewise be appreciated that other monetary instruments, assets, currency and the like can be the subject of the systems described herein and other implementation are within the scope of the appended claims.

Figure 11:
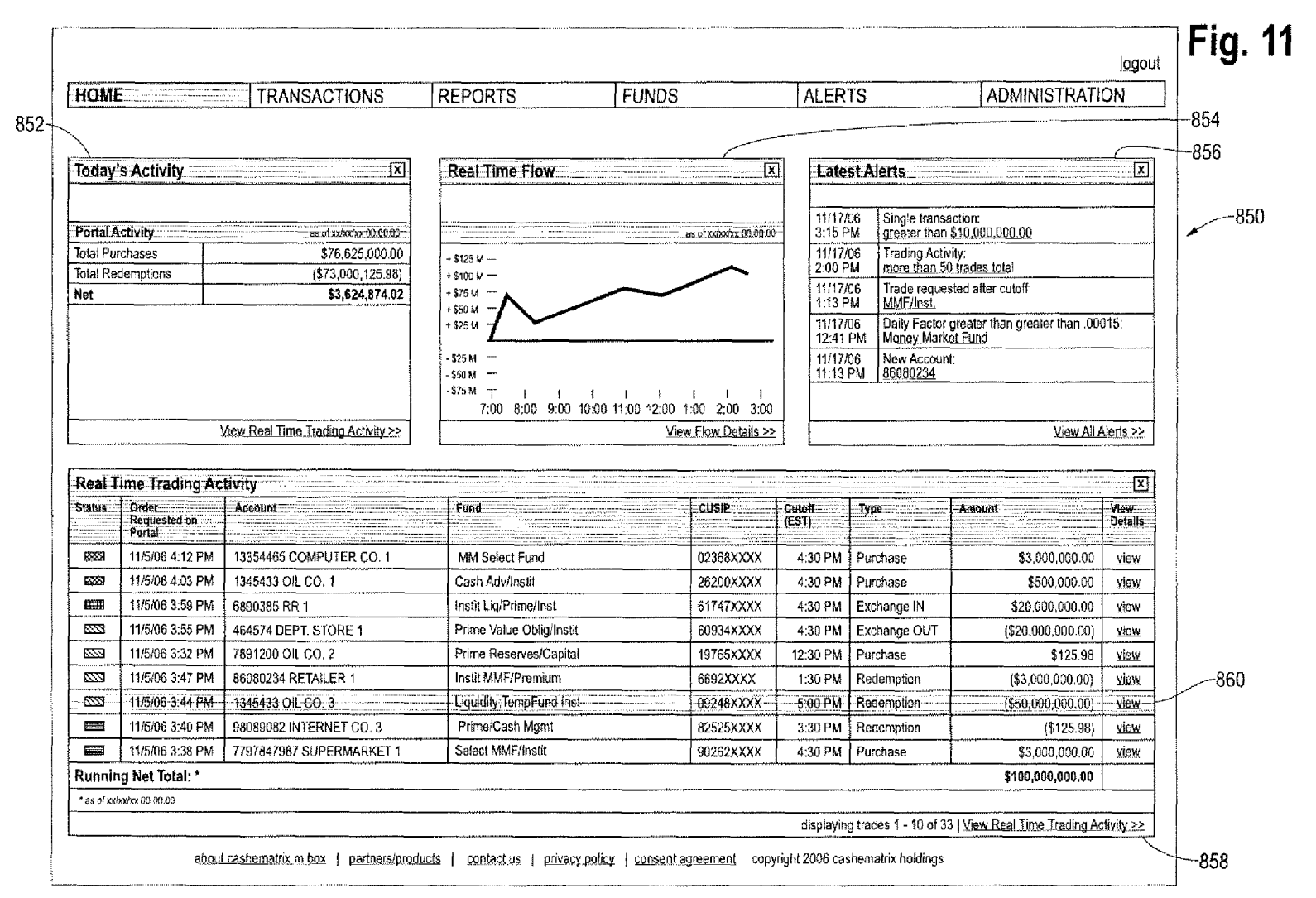

The graphical user interface available to users associated with a given mutual fund can take the form of a dashboard, such as that shown in FIG. 11. Dashboard 850 presents multiple graphical indicia corresponding to various aspects of transactions of concern to the user associated with a given mutual fund. Thus, for example, the graphical indicia 852, entitled "Today's Activities," summarize cash flow across one or more portals on which the given mutual fund is available. Graphical indicia 854, entitled "Real Time Flow," provide a line graph of real time cash flow versus the starting point for the mutual fund assets at the outset of the day. Graphical indicia 856, entitled "Latest Alerts," display corresponding messages when certain criteria have been met, such criteria either being predetermined threshold values, either pre-established or selected by one or more users. In this way, different users can choose different alerts, types of alerts, thresholds, and display formats for such alerts in accordance with preferences or any other factors of importance to the user.

Graphical indicia 858, entitled "Real Time Trading Activities," provide a snapshot of recent transactions during a relevant time period. Thus, for example, the last ten transactions of a given trading day can be displayed in a list format. The list can be in a table with various columns and associated headings providing more or less detail, depending on the application. Highlighting 860 can be provided, if a given transaction has generated an alert. The list displayed in indicia 858 can be automatically or selectively updated.

Each of the graphical indicia shown in dashboard 850 can be configured to present information as of a certain point in time during a pre-determined time period. Thus, for example, the information presented can be cumulative as of a point in time during a trading day. Other time periods and frequencies of presentation are likewise possible.

Dashboard 850 can be preset by the portal provider, the mutual fund, or any other entity, or can be customizable by these entities or users associated with these entities.

Still further information can be presented through the graphical user interface, including the use of graphical indicia to show net total revenue streams for a mutual fund, total purchase, total redemptions, real-time cash flow, and running net total transactions. Report generation engine 822 (FIG. 8) can access one or more suitable data structures to provide monthly sales by territory, AUM, quarterly sales comparisons, sales trends by fund, individual progress reports, sales goals, and new accounts by territory. These reports and corresponding presentations may be useful to mutual fund personnel to keep track of commissions, goals, and other performance criteria associated with sales agents for their mutual funds.

A number of embodiments have been described. Nevertheless, it will be understood that various modifications can be made. For example, features of the above-described implementations generally can be combined in ways not discussed and other features or variations not discussed also can be used. Accordingly, other implementations are within the scope of the following claims.

The invention claimed is:

1. A computer system for fund management comprising:
a processor configured to:
(a) receive information related to a plurality of fund trading transactions of a fund, through at least one of a plurality of portals, wherein the information is received straight-through and without waiting for an end-of-day omnibus settlement, and wherein the information includes a dollar amount associated with each of the plurality of fund trading transactions;
(b) perform financial calculations for the plurality of fund trading transactions based on the received information, wherein said financial calculations are in the group consisting of: calculating a dollar amount associated with each of the plurality of fund trading transactions of the fund as of a point in time during the trading day; calculating a cumulative dollar amount associated with the plurality of fund trading transactions of the fund as of the point in time during the trading day; and calculating an amount of trading activity based on the plurality of fund trading transactions of the fund received as of the point in time during the trading day;
(c) automatically update a data structure for the plurality of fund trading transactions of the fund in response to the financial calculations performed; and
(d) in response to the automatic updating of the data structure, present indicia on a first graphical user interface corresponding to the updated data structure, the processor configured to present indicia in the group consisting of the following:
(i) an updated display of a graph representing real-time flow of the dollar amounts associated with the plurality of fund trading transactions of the fund, the real-time flow measured from a starting point of the trading day to the point in time during the trading day;
(ii) an updated display of a table of the cumulative dollar amounts for the plurality of fund trading transactions of the fund corresponding to the real time flow; and
(iii) an updated display of an alert in the event that a predetermined criterion is met, the criterion selected from the group consisting of whether the dollar amount for at least one of the plurality of fund trading transactions exceeds a first threshold as of the point in time during the trading day, and whether the amount of trading activity for a trading day exceeds a second threshold as of the point in time during the trading day; and
(e) the computer system repeating limitations (a)-(d) continuously and in real-time during a trading day.

2. The computer system of claim 1, further comprising a graphical user interface configured to receive a payment instruction for at least one of the plurality of fund trading transactions of the fund before a deadline for making the end-of-day omnibus settlement.

3. The computer system of claim 2, wherein the fund trading transactions of the fund include redemptions, purchases and exchanges;
wherein performing the financial calculations includes settlements of the fund trading transactions of the fund associated with the exchanges as the exchanges are received;
wherein performing the financial calculations includes determining totals of the purchases and redemptions for the fund with the payment instruction before the deadline for making the end-of-day omnibus settlement; and
wherein performing the financial calculations includes excluding from the payment instruction the settlements of the fund trading transactions of the fund.

4. The computer system of claim 1, wherein the financial calculations includes determining for the fund at least one of the group consisting of monthly sales by territory, Assets Under Management (AUM), quarterly sales comparisons, sales trends by fund, individual progress towards sales goal, and new accounts by territory.

5. The computer system of claim 1, wherein the fund comprises at least one of a mutual fund, a money market mutual fund, and a money market fund.

6. A method for fund management comprising:
   (a) a computer system receiving information related to a plurality of fund trading transactions of the fund, through at least one of a plurality of portals, wherein the information is received straight-through and without waiting for an end-of-day omnibus settlement, and wherein the information includes a dollar amount associated with each of the plurality of fund trading transactions;
   (b) the computer system performing financial calculations for the plurality of fund trading transactions based on the received information, wherein said financial calculations are in the group consisting of: calculating a dollar amount associated with each of the plurality of fund trading transactions of the fund as of a point in time during the trading day; calculating a cumulative dollar amount associated with the plurality of fund trading transactions of the fund as of the point in time during the trading day; and calculating an amount of trading activity based on the plurality of fund trading transactions of the fund received as of the point in time during the trading day;
   (c) the computer system automatically updating a data structure for the plurality of fund trading transactions of the fund with the financial calculations performed; and
   (d) in response to the automatic updating of the data structure, the computer system presenting indicia on a first graphical user interface corresponding to the updated data structure, the presenting of indicia comprising at least one of the following:
      (i) updating a display of a graph representing real-time flow of the dollar amount associated with each of the plurality of fund trading transactions of the fund, the real-time flow measured from a starting point of the trading day to the point in time during the trading day;
      (ii) updating a display of a table of the cumulative dollar amount for the plurality of fund trading transactions of the fund corresponding to the real-time flow; and
      (iii) updating a display of an alert in the event that a predetermined criterion is met, the criterion selected from the group consisting of whether the dollar amount for at least one of the plurality of fund trading transactions exceeds a first threshold as of the point in time during the trading day, and whether the amount of trading activity exceeds a second threshold as of the point in time during the trading day;
   (e) the computer system repeating limitations (a)-(d) continuously and in real-time during a trading day; and
   (f) the computer system receiving a payment instruction based on at least one of the plurality of fund trading transactions before a deadline for making the end-of-day omnibus settlement, wherein the payment instruction is based on the indicia presented.

7. The method of claim 6, wherein information includes receiving information identifying users associated with the fund trading transactions of the portal.

8. The method of claim 6, wherein the fund comprises at least one of a mutual fund, a money market mutual fund, or a money market fund.

9. An apparatus for fund management comprising:
   a processor configured to:
   (a) receive information related to a plurality of fund trading transactions of a fund, through at least one of a plurality of portals, wherein the information is received straight-through and without waiting for an end-of-day omnibus settlement, and wherein the information includes a dollar amount associated with each of the plurality of fund trading transactions;
   (b) perform financial calculations for the plurality of fund trading transactions based on the received information, wherein said financial calculations are in the group consisting of: calculating a dollar amount associated with each of the plurality of fund trading transactions of the fund as of a point in time during the trading day; calculating a cumulative dollar amount associated with the plurality of fund trading transactions of the fund as of the point in time during the trading day; and an amount of trading activity based on the plurality of fund trading transactions of the fund received as of the point in time during the trading day;
   (c) automatically update a data structure for the plurality of fund trading transactions of the fund in response to the financial calculations performed; and
   (d) in response to the automatic updating of the data structure, presenting indicia on a first graphical user interface corresponding to the updated data structure, the processor configured to present indicia comprising at least one of the following:
      (i) an updated display of a graph representing real-time flow of the dollar amount associated with the plurality of fund trading transactions of the fund, the real-time flow measured from a starting point of the trading day to the point in time during the trading day;
      (ii) an updated display of a table of the cumulative dollar amount for the plurality of fund trading transactions of the fund corresponding to the real-time flow; and
      (iii) an updated display of an alert in the event that a predetermined criterion is met, the criterion selected from the group consisting of whether the dollar amount for at least one of the plurality of fund trading transactions exceeds a first threshold as of the point in time during the trading day, and whether a trading activity for a trading day exceeds a second threshold as of the point in time during the trading day; and
   (e) repeat limitations (a)-(d) continuously and in real-time during a trading day; an input device linked to the processor and configured to:
   (f) receive a payment instruction based on at least one of the plurality of fund trading transactions before a deadline for making the end-of-day omnibus settlement, wherein the payment instruction is based on the indicia presented.

10. The apparatus of claim 9, wherein the indicia comprise a real time summary of a cash flow across the plurality of portals.

* * * * *